United States Patent [19]

Cella, Jr.

[11] 4,031,058

[45] June 21, 1977

[54] HOT MELT SEALANTS

[75] Inventor: Richard Joseph Cella, Jr., Wilmington, Del.

[73] Assignee: E. I. Du Pont de Nemours and Company, Wilmington, Del.

[22] Filed: Dec. 19, 1975

[21] Appl. No.: 642,234

Related U.S. Application Data

[63] Continuation-in-part of Ser. No. 570,721, April 23, 1975, abandoned.

[52] U.S. Cl. .................. 260/33.8 UA; 260/31.6; 526/318
[51] Int. Cl.$^2$ ............... C08K 5/02; C08K 5/10; C08F 18/14
[58] Field of Search ............ 260/31.6, 33.8 UA; 526/318

[56] References Cited

UNITED STATES PATENTS

| | | | |
|---|---|---|---|
| 2,599,123 | 6/1952 | Pinkney et al. | 526/318 |
| 3,823,108 | 7/1974 | Bissot | 526/318 |
| 3,904,588 | 9/1975 | Greene | 526/318 |

OTHER PUBLICATIONS

B570,721, Mar. 1976, Cella, 260/31.6.

*Primary Examiner*—Donald E. Czaja
*Assistant Examiner*—H. H. Fletcher

[57] ABSTRACT

Hot melt compositions useful as sealants for metal to glass seals containing partially neutralized ethylene/methyl acrylate/maleic acid monoethyl ester copolymer, tackifier, filler, and plasticizer.

7 Claims, No Drawings

HOT MELT SEALANTS

REFERENCE TO PRIOR FILED APPLICATION

This application is a continuation-in-part of U.S. Patent Application Ser. No. 570,721, filed Apr. 23, 1975 and now abandoned.

This invention relates to a hot melt adhesive (sealant) having improved properties.

Numerous hot melt adhesive compositions are known in the art, and the compositions often contain an elastomeric polymer, a tackifying resin, and a viscosity modifying agent, usually a wax. Such prior art compositions often contain various fillers, stabilizers, antioxidants and the like.

Hot melt sealants are used to seal double glazing units to be used as windows. See for example U.S. Pat. No. 3,822,172 to Rullier. Other uses for such sealants are the sealing of automobile windows and, in general, as architectural glass sealants.

Hot melt adhesives when used as sealants should have the following properties: (1) the sealant should adhere adequately to the surface to which it is applied; (2) the sealant should be elastomeric; (3) the sealant should flow readily at application temperature when under shear, but in the absence of shear the sealant should retain its shape; (4) the sealant should have a high failure temperature.

The present invention provides a composition with the above listed desirable properties.

The present invention is a blend of a partially neutralized random copolymer of ethylene/methyl acrylate/maleic acid monoethyl ester, with a tackifying resin, a plasticizer, and an inorganic filler.

Partially neutralized random copolymers of ethylene and a monomer containing acid groups are taught in Rees's U.S. Pat. No. 3,264,272. This patent also discloses that the copolymer may contain other monomers. Random copolymers of ethylene/methyl acrylate/maleic acid monoethyl ester are known and taught, for example, in Belgian Pat. No. 818,609, issued Feb. 10, 1975.

The random copolymer useful in the present invention contains about 50 to 60 wt. % polymerized methyl acrylate units, about 3 to 5 wt. % polymerized maleic acid monoethyl ester units and about 35 to 47 wt. % polymerized units of ethylene. The copolymers may also contain minor amounts of other polymeric units such as those listed in the Rees patent. Between about 5% and about 50% of the maleic acid monoethyl ester units are neutralized with sodium and/or potassium ions. Processes for the neutralization of acid groups in random ethylene copolymers are taught in Rees U.S. Pat. No. 3,404,134. Preferably, the copolymer prior to neutralization has a molecular weight such that the melt index of the copolymer is within the range of about 1 to 30 g per 10 minutes.

Tackifying resins suitable for use in the present invention are commercially available. A tackifier sold as "Piccovar" AP-10 by Hercules Incorporated is entirely satisfactory. This resin is an alkyl-aromatic product that is soluble in aliphatic hydrocarbon solvents. It has the following physical properties: (1) color range, coal tar scale 4-6; (2) softening point ° C., 10; (3) acid number, maximum 1; (4) saponification number, maximum 1; (5) specific gravity, .93; (6) melt viscosity, 1 poise 85° C., 10 poises at 63° C. and 100 poises at 40° C. Another commercially available tackifier useful in the present invention is "Piccoumaron" 10. This resin is a polyindene type polymer and has the following physical properties: (1) color range, coal tar scale 3-5; (2) softening point ° C, 10; (3) acid number, maximum 1; (4) saponification number, maximum 1; (5) specific gravity, 1.04; (6) melt viscosity, 1 poise at 95° C., 10 poises at 55° C. and 100 poises at 40° C. Other suitable tackifiers having similar physical properties are well known in the art and can be employed. Flanagan's U.S. Pat. No. 3,573,240 lists other tackifying resins. The amount of tackifying resin in the hot melt adhesive of the present invention is between about 50 parts by wt. to about 250 parts by wt. per 100 parts by wt. of ethylene/methyl acrylate/maleic acid monoethyl ester copolymer.

A third component of the hot melt adhesives of the present invention is an inorganic filler. The filler should be present in the adhesive in the amount of about 50 parts by wt. to about 150 parts by wt. per 100 parts by wt. of ethylene/methyl acrylate/maleic acid monoethyl ester copolymer. Suitable inorganic fillers include carbon black, calcium carbonate, titanium dioxide, clays, and silica. Mixtures of fillers can also be used.

The fourth component of the compositions of this invention is a plasticizer. The amount of plastizer needed if from about 10% to about 50 wt. % based on the weight of the tackifying resin. Suitable plasticizers must have the property of not interfering with the ionic bonds of the partially neutralized ethylene/methyl acrylate/maleic acid monoethyl ester copolymer. Such plasticizers include the chlorinated paraffins, such as "Chlorowax" 40, sold by Diamond Shamrock Corporation, which is a 40% chlorinated paraffin and has a Brookfield viscosity of 32 poises. Polyester plasticizers such as "Harflex" 330, sold by Wallace and Tiernan Inc., a polymeric plasticizer of 1,3-butylene glycol and adipic acid, having a viscosity of 2340 centipoises at 100° F. are also suitable.

In the following examples which illustrate the invention all parts and percentages are in parts by weight unless otherwise specified.

In the examples the following tests are used to determine the properties of the products obtained.

MELT INDEX

ASTM D1238-70
Condition D (190° C., 325 gm load)
Condition E (190° C., 2160 gm load).

LAP SHEAR FAILURE TEMPERATURE (HOT BOND STRENGTH)

A lap shear test specimen was prepared by placing a strip of hot melt adhesive (sealant) between a 1 × 5 × 7/16 inch piece of clean glass and a 1 × 4 × 0.005 inch strip of aluminum and allowing the sealant to flow out under pressure at 350° F. A 2 inch square bond area was obtained and shims were used to achieve a bond line thickness of 1/16 inch. The specimen was suspended vertically from the glass end in an oven, and a 1 pound load attached to the aluminum end. The oven temperature was raised from room temperature in increments of 5° C. every 20 minutes, and the lowest temperature at which failure occurred in the bond area was recorded.

BRITTLE TEMPERATURE

A 1/16 inch thick layer of hot melt adhesive (sealant) was laminated to the surface of a 1 × 4 × 0.005 inch strip of aluminum by pressing a piece of the sealant between the aluminum and a piece of polytetrafluoroethylene in a press at 350° F. The specimen was cooled to room temperature and the polytetrafluoroethylene strip peeled away. The aluminum/sealant specimen was cooled in a bath to the desired low temperature, removed quickly, and placed on a rectangular wooden block with ½ overhang. The specimen was quickly bent 90° over the edge of the block. The highest temperature at which the sealant cracked was defined as the brittle temperature.

ALUMINUM/GLASS PEEL STRENGTH

A peel specimen with a hot melt adhesive layer having a 1/16 inch bond line thickness was prepared by laminating a 5 × 1 × 7/16 inch piece of clean glass to a 8 × 1 × 0.005 inch strip of aluminum at 350° F. with a 3 square inch overlap area. The aluminum was stripped away from the glass at an angle of 180° in an Instron tensile tester at a rate of 50 inch/min. The average value of the peel strength was recorded in pounds per linear inch (pli). In all the examples the hot salt adhesive failed cohesively. This fact is designated in the Table by the letter (c).

EXAMPLE 1

A 45.2% neutralized ionomer was prepared by blending 500 gms of a random copolymer having a melt index of about 4.7 g per 10 min. containing 41.5 wt. % ethylene (E), 54.7 wt. % methyl acrylate (MA), and 3.8 wt. % maleic acid monoethyl ester (MAME) with 15 mls of a 4N sodium hydroxide solution (0.452 milli-equivalents sodium/meq MAME) on a rubber mill at 150° C. The sealant was prepared by mixing 27 gms of ionomer with 30 gms of FEF carbon black, 33 gms of an alkyl-aromatic thermoplastic resin having a softening point of 10° C. and a melt viscosity of 1 poise at 85° C. (sold by Hercules Incorporated as "Piccovar" AP-10), and 10 gms of a 40% chlorinated paraffin having a Brookfield viscosity of 32 poises (sold by Diamond Shamrock Corp. as "Chlorowax" 40) in a sigma-blade mixer at a temperature of 140° C. The properties of this sealant are shown in Table I.

EXAMPLE 2

The sealant was prepared as in Example 1 except that an equal weight of a polyindene type highly aromatic thermoplastic hydrocarbon resin having a softening point of 10° C. and a melt viscosity of 1 poise at 95° C. (sold by Hercules Incorporated as "Piccoumaron" 10) was used in place of the "Piccovar" AP-10. The properties are shown in Table I.

EXAMPLE 3

The sealant was prepared as in Example 1 except that an equal weight of a polyester plasticizer having a viscosity of 2340 cps at 100° F. (sold by Wallace and Tiernan, Inc. as "Harflex" 330) was used in place of the "Chlorowax" 40. The properties are shown in Table I.

EXAMPLE 4

The sealant was prepared as in Example 1 except that an equal weight of a 30.2% neutralized ionomer formed by blending 500 gms of a 41.5/54.7/3.8 E/MA/MAME copolymer having a melt index of about 4.7 g per 10 min. with 10 mls of 4 N NaOH solution (0.302 meq sodium/meq MAME) on a mill at 150° C. was used instead of the ionomer described in Example 1. The properties are shown in Table I.

EXAMPLE 5

An ionomer was prepared by blending 225 gms of a random copolymer having a melt index of about 9.7 g per 10 min. containing 41.7 wt. % ethylene (E), 54.4 wt. % methyl acrylate (MA), and 3.9 wt. % maleic acid monoethyl ester (MAME) with 1.53 gm of sodium carbonate (.24 meq sodium/meq MAME) in a Banbury mixer at 150° C. The sealant was prepared by mixing 22 gms of ionomer with 24 gms of FEF carbon black, 19 gms of an alkyl-aromatic thermoplastic hydrocarbon resin having a softening point of 10° C. and a melt viscosity of 1 poise at 85° C. (sold by Hercules Incorporated a "Piccovar" AP-10), and 7 gms of a 40% chlorinated paraffin having a Brookfield viscosity of 32 poises (sold by Diamond Shamrock Corp. as "Chlorowax" 40) in a sigma-blade mixer at a temperature of 140° C. The properties of this sealant are shown in Table I.

TABLE I

| Example No. | SEALANT PROPERTIES | | | | |
|---|---|---|---|---|---|
| | 1 | 2 | 3 | 4 | 5 |
| Al/Glass Peel, 50"/min (pli) | 33(c) | 31(c) | 44(Al Broke) | 29(c) | 27(c) |
| Lap Shear Failure Temp. (° C.) | 145 | 125 | 190 | 110 | 155 |
| Brittle Temp. (° C.) | −50 | −50 | −45 | −50 | −45 |
| Melt Index, Condition D | .13 | .11 | .01 | .05 | .09 |
| Melt Index, Condition E | 25 | 55 | 1.6 | 38 | 7.0 |

The data in the Table show that the hot melt adhesives (sealants) adhere well to the surface to which they are applied. Th adhesives are elastomeric, as shown by their Brittle Temperature. The adhesives flow when under a moderate amount of shear, Melt Index Condition E, but retain their shape when under low shear, Melt Index Condition D. The adhesives have a high failure temperature, as shown by Lap Shear Failure Temperature. Thus the hot melt adhesives are particularly useful as sealants for applications involving glass to metal seals.

I claim:
1. A hot melt adhesive comprising
   a. 100 parts by weight of a random ethylene/methyl acrylate/maleic acid monoethyl ester polymer in which polymerized methyl acrylate units are present in the amount of about 50–60 wt. %, in which polymerized maleic acid monoethyl ester units are present in the amount of about 3–5 wt. %, and in which polymerized ethylene units are present in the amount of about 35 to 47 wt. %, the maleic acid monoethyl ester units are from 5 to 50% neutralized with ions selected from the class consisting of sodium ions and potassium ions;
   b. about 50 to 150 parts by weight of an inorganic filler;
   c. about 50 to 250 parts by weight of a tackifying resin, and
   d. about 10 to 50 wt. %, based on the weight of the tackifying resin, of a plasticizer.
2. The composition of claim 1 in which the inorganic filler is at least one member selected from the class consisting of carbon black, calcium carbonate, titanium dioxide, clays and silica; the tackifying resin is a thermoplastic hydrocarbon resin; and the plasticizer is chlorinated paraffin.

3. The composition of claim 1 in which the random ethylene/methyl acrylate/maleic acid monoethyl ester copolymer has a melt index in the range of about 1 to 30 grams per 10 minutes.

4. The composition of claim 1 in which the filler is carbon black.

5. The composition of claim 4 in which the plasticizer is a chlorinated paraffin.

6. The composition of claim 4 in which the ethylene/methyl acrylate/maleic acid monoethyl ester is partially neutralized with sodium ions.

7. The composition of claim 6 in which the plasticizer is an alkyl-aromatic thermoplastic hydrocarbon resin having a softening point of about 10° C.

* * * * *